US006990492B2

(12) United States Patent
Gupta

(10) Patent No.: US 6,990,492 B2
(45) Date of Patent: Jan. 24, 2006

(54) METHOD FOR CONTROLLING ACCESS TO INFORMATION

(75) Inventor: Arun Kumar Gupta, Easton, CT (US)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 10/356,662

(22) Filed: Jan. 31, 2003

(65) Prior Publication Data

US 2003/0167269 A1    Sep. 4, 2003

Related U.S. Application Data

(63) Continuation of application No. 09/434,895, filed on Nov. 5, 1999, now Pat. No. 6,516,315.

(60) Provisional application No. 60/107,126, filed on Nov. 5, 1998.

(51) Int. Cl.
 *G06F 17/30* (2006.01)
(52) U.S. Cl. ......................................................... 707/9
(58) Field of Classification Search ............... 707/9, 707/103 X, 103 Y, 103 Z, 103 R
 See application file for complete search history.

(56) References Cited

U.S. PATENT DOCUMENTS

| | | | |
|---|---|---|---|
| 4,621,321 A | | 11/1986 | Boebert et al. ................. 707/8 |
| 5,204,812 A | | 4/1993 | Kasiraj et al. .................. 707/9 |
| 5,276,901 A | | 1/1994 | Howell et al. .................. 707/9 |
| 5,446,903 A | | 8/1995 | Abraham et al. ........... 710/240 |
| 5,499,371 A | | 3/1996 | Henninger et al. ......... 717/108 |
| 5,572,673 A | | 11/1996 | Shurts ......................... 713/200 |
| 5,787,427 A | * | 7/1998 | Benantar et al. ............... 707/9 |
| 5,826,268 A | | 10/1998 | Schaefer et al. ............... 707/9 |
| 5,911,143 A | | 6/1999 | Deinhart et al. ............ 707/103 |
| 5,999,978 A | * | 12/1999 | Angal et al. ................. 709/229 |
| 6,038,563 A | | 3/2000 | Bapat et al. .................. 707/10 |
| 6,044,373 A | * | 3/2000 | Gladney et al. .............. 707/10 |
| 6,105,027 A | | 8/2000 | Schneider et al. ............. 707/9 |
| 6,141,754 A | | 10/2000 | Choy ......................... 713/200 |
| 6,236,996 B1 | * | 5/2001 | Bapat et al. .................... 707/9 |
| 6,292,798 B1 | | 9/2001 | Dockter et al. ................ 707/9 |
| 6,412,070 B1 | * | 6/2002 | Van Dyke et al. .......... 713/200 |
| 6,484,173 B1 | * | 11/2002 | O'Hare et al. ................. 707/9 |
| 6,516,315 B1 | * | 2/2003 | Gupta ........................... 707/9 |

OTHER PUBLICATIONS

Sandhu et al., Expressive Power of the Single-Object Typed Access Matrix Model, IEEE Proceedings Ninth Annual Computer Security Applications Conference, p. 184-194, Dec. 1993.*

Ravi S. Sandhu et al.: "Access Control: Principles and Practice" IEEE Communications Magazine, U.S. IEEE Service Center, Piscataway, N.J., vol. 32, No. 9, Sep. 1, 1994, pp. 40-48.

* cited by examiner

*Primary Examiner*—Greata Robinson

(57) ABSTRACT

A method for controlling access to information, which includes a plurality of data objects, on a computer system being accessible to a plurality of users is provided which generally comprises providing an access right for each relationship between a user and a data object, wherein each user can have a plurality of relationships to each data object, determining each relationship between the user and the data object when a user requests information about a data object, determining the security classification for each relationship between the user and the data object, and then granting the user access to the data object if one of the security classifications for all the relationships is equal to or greater than the security classification of the data object, and denying the user access to the data object if the security classifications for all the relationships is less than the security classification of the data object.

17 Claims, 10 Drawing Sheets

FIG.5

ROLES (78)

- SYSTEM USER
  - ADMINISTRATOR
- PROVIDER CEO
  - CFO
  - MEDICAL DIRECTOR
  - HEAD OF DEPARTMENT
  - SENIOR STAFF
  - STAFF
  - ATTENDING
- PATIENT PRIMARY CARE PROVIDER
  - SPECIALIST
  - CONSULTANT
- WARD NURSE
  - RESIDENT
  - INTERN

ACCESS RIGHTS (80)

| SECURITY CLASSIFICATIONS (82) | FUNCTION CLASSIFICATIONS (84) |
|---|---|
| SystemCommon | ReadOnly |
| SystemSensitive | FULL |
| PatientFinancial | ReadWrite |
| PatientFinancialSensitive | ReadOnly |
| PatientClinicalSensitive | FULL |
| PatientFinancial | ReadOnly |
| PatientBio | Readonly |
| PatientClinical | ReadOnly |
| PatientBio | ReadOnly |

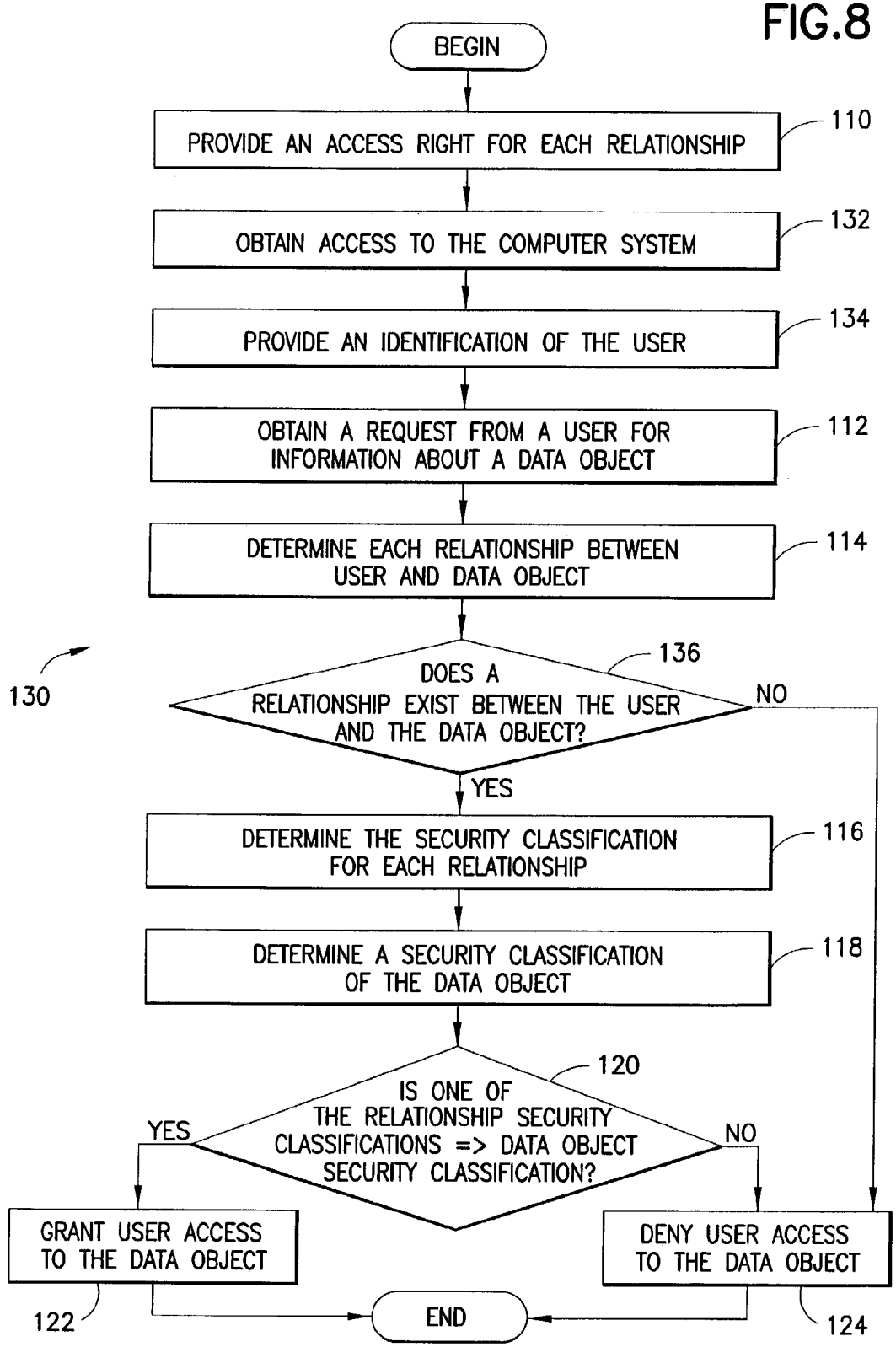

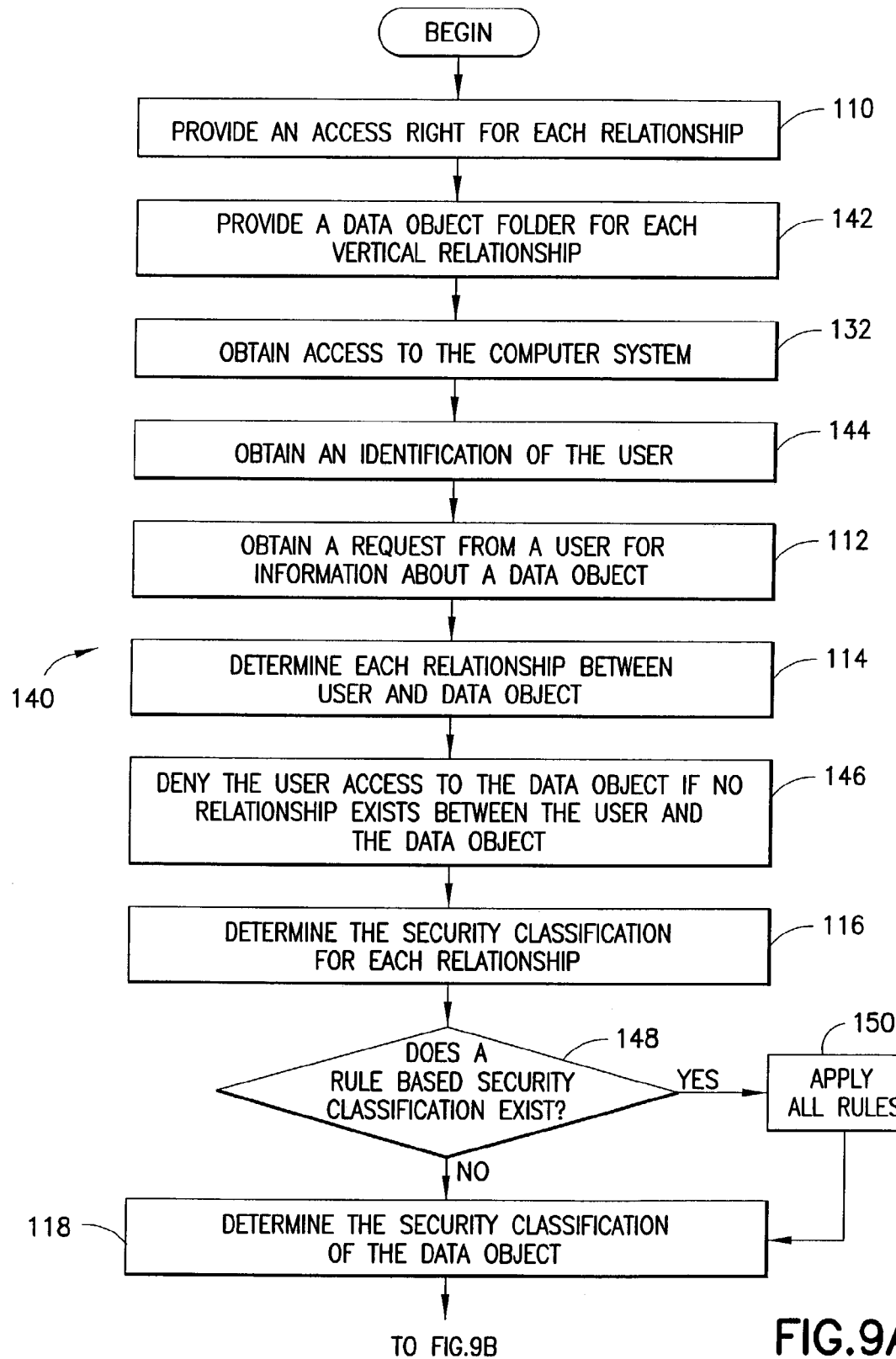

METHOD FOR CONTROLLING ACCESS TO INFORMATION

RELATED APPLICATIONS

This application is a continuation of Ser. No. 09/434,895, filed on Nov. 5, 1999 and now U.S. Pat. No. 6,516,315, claims priority from U.S. Provisional Application No. 60/107,126 filed on Nov. 5, 1998, which is herein incorporated by reference.

FIELD OF THE INVENTION

The invention relates to a method of controlling access to information. More specifically, the invention relates to controlling user access to computer database information, possibly accessible in a client/server environment, in which the user may have an association with one or more objects in the database.

BACKGROUND OF THE INVENTION

As information has become more widely available to a larger number of corporate network users as well as to vendors, customers and the public, the need for precisely controlling access to this information has become paramount. Previous methods of access control, however, have not adequately met these needs.

Previous methods of access control focused on granting or denying access to classes of objects, but did not restrict access to specific objects, which is a practical necessity throughout business. Some examples of restricting access to specific objects include limiting patient information to only the caregivers that are currently treating them, limiting project information to current project team members, limiting department information to the current department employees, and limiting employee information to their current supervisors.

Even when an adequate level of access control has been achieved, it can be cumbersome to implement it because daily administration of access control lists may be required. For example, U.S. Pat. No. 5,276,901 to Howell et al. discloses a system for controlling group access to objects that uses group access control folders each having a security clearance. Folders can have a public access designation or an explicit access designation and/or a controlled access designation. For a user to have access to a folder having an explicit access designation, the user's ID must be listed explicitly within the folder. For a user to have access to a folder having a controlled access designation, the user must first have an affinity to the folder and can then access the folder if the user's clearance level is equal to or greater than the clearance level of the folder.

The disadvantage with the system of the '901 patent is that for a user who has an affinity to a folder having a controlled access designation and who is not listed in the folder's explicit access list, the system compares the clearance level of the folder to the clearance level of the user and not the clearance level of the affinity or relationship itself. Thus, this system thus does not provide for situations in which a user may have more than one relationship with a folder or an object wherein each relationship may have a different security level classification. Otherwise, to allow for flexibility of access in this system, the explicit access designation lists may have to be updated frequently, which can be time consuming.

U.S. Pat. No. 5,204,812 to Kasiraj et al. describes a method of controlling user access of documents based upon the relationship between the documents. Documents can be placed in a set comprising a linear relationship with the set of documents as a whole having a sensitivity classification. User access is controlled by determining the classification of the user and comparing it the sensitivity classification of the set of documents.

U.S. Pat. No. 5,204,812 to Kasiraj et al. also describes a prior art document classification method in which documents are protected based upon their classification of use such as "loan application," while users are given classifications such as "loan officer." A system administrator would set up allowable document labels and retention periods such that, for instance, the loan officer could view the loan application for a period of three years while the loan is active. The methods and prior method described in the '812 patent to Kasiraj et al., however, also do not provide for multiple relationships between an object and the user.

What is desired, therefore, is an access control technology in which users can access only those data objects that they have a relationship or association with, wherein each user may have one or more relationships with a data object and each different relationship can have a different security classification. It is further desired that the system can control the types of functions a user can perform on the data object and that the system does not required daily administration of access control.

SUMMARY OF THE INVENTION

Accordingly, an object of the present invention is to provide a method for access control of information on a computer system in which users can access only those data objects to which they have an appropriate security classification.

It is a further object of the present invention to provide a method of the above type in which the system can precisely control the parts of the data object that the user can access.

In another embodiment of the present invention, it is an object to provide a method of the above type in which the system can precisely control the types of functions that can be performed on the data object once a user has access to the object.

It is still another object of the present invention to provide a method of the above type in which daily administration of the access control is unnecessary.

These objects of the invention are achieved by a method for controlling access to information, which includes a plurality of data objects, on a computer system being accessible to a plurality of users, wherein the method generally comprises providing an access right for each relationship between a user and a data object, wherein each user can have a plurality of relationships to each data object, determining each relationship between the user and the data object when a user requests information about a data object, determining the security classification for each relationship between the user and the data object, and then granting the user access to the data object if one of the security classifications for all the relationships is equal to or greater than the security classification of the data object, and denying the user access to the data object if the security classifications for all the relationships are less than the security classification of the data object.

BRIEF DESCRIPTION OF THE DRAWINGS

FIG. 5. is a block diagram showing examples of roles and associated access rights.

FIG. 8 is a more detailed flow diagram showing the method of the present invention.

FIGS. 9A and 9B are even more detailed flow diagrams showing the method of the present invention.

DETAILED DESCRIPTION OF THE INVENTION

The present invention provides a method for controlling access to information on a computer system being accessible to a plurality of users. Each user of the system can have a plurality of relationships to each data object of information. When the user asks for information about the data object, the system determines each relationship between the user and the data object and determines the security classification for each relationship. Finally, the system then grants the user access to the data object if one of the security classifications for all the relationships is equal to or greater than the security classification of the data object, or denies the user access to the data object if all the security classifications are less than the security classification of the data object. The security classifications can also have a hierarchical structure.

Figure 1:
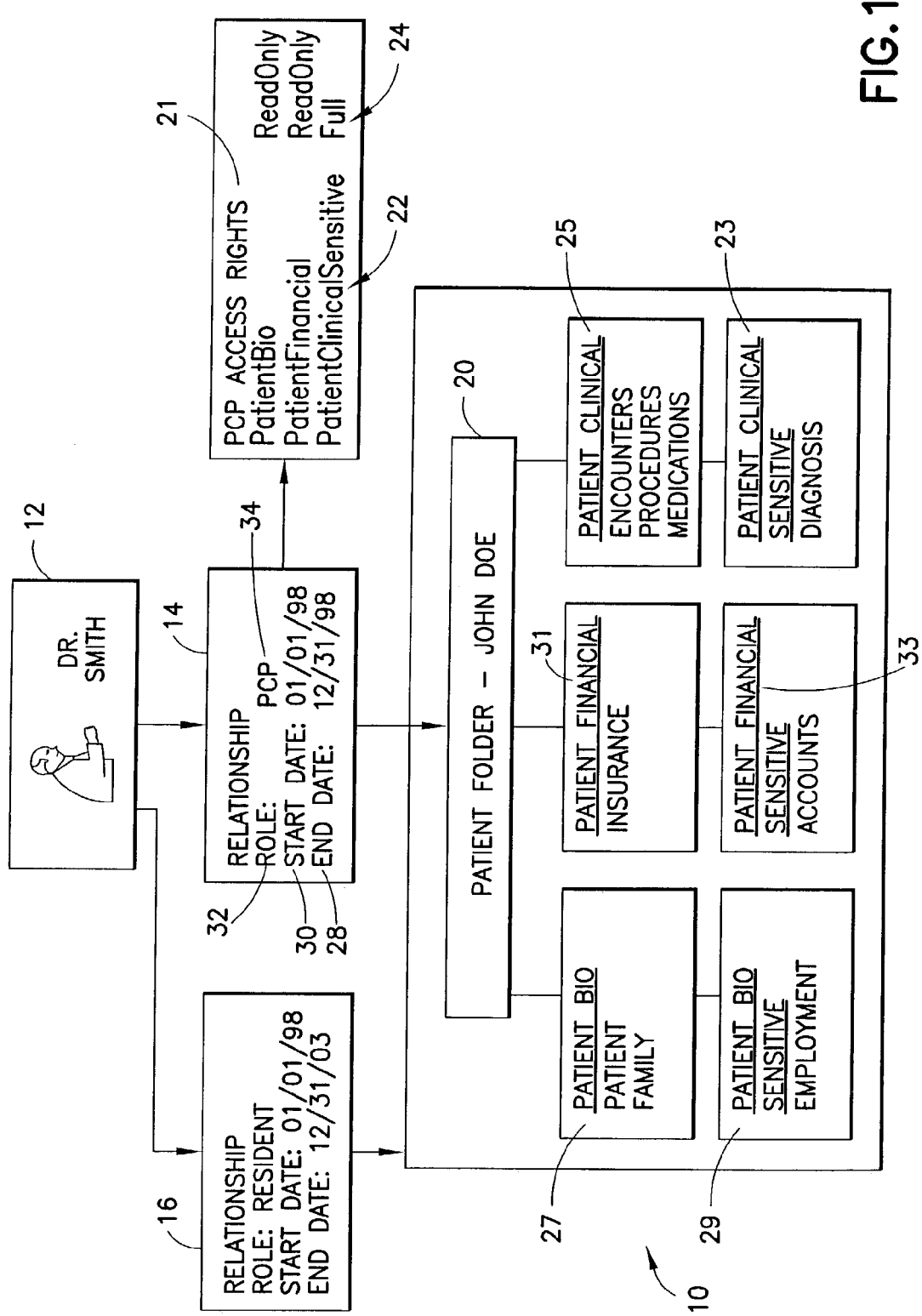
FIG. 1 is a block diagram of an example of file associated with an access control system in accordance with the present invention.

The organization of information method of controlling access to information in accordance with the present invention is illustrated through the block diagram 10 shown in FIG. 1. A subject 12, Dr. Smith has a relationship with an object entitled John Doe's patient folder 20. By virtue of this relationship, Dr. Smith's has potential access to the patient folder 20 of John Doe. However, Dr. Smith does not have indiscriminate access to all parts of the folder. The relationship 14 between the subject 12 and the object 20 specifies the role 32 of the subject for the object. The role in this case is that of a Primary Care Provider (PCP) 34. The patient folder 20 is marked with security classification labels 22 that indicate the type of information from a security perspective and its sensitivity. Every role 34 is defined with access rights 21 that preferably include security classification labels 22 and function classifications 24. Thus, Dr. Smith has read-only access to the part of the folder that is marked as PatientBio 27, except the part that is marked PatientBio-Sensitive 29. He also has read-only access to the part of the folder that is marked as PatientFinancial 31, except the part that is marked PatientFinancialSensitive 33. He has full access to the parts of the folder marked PatientClinical 25, including the parts that are marked PatientClinicalSensitive 23.

Although this disclosure herein generally uses object-oriented terminology to describe the system, the access control system of the present invention is applicable to any type of information system, including object-oriented, relational and conceptual information systems. Table 1 lists the object-oriented terms used herein, and the equivalent terms currently used in relational and conceptual information systems.

TABLE 1

Object Oriented Terms, Equivalent Terms and Definitions.

| Term Used | Equivalent Terms | Definition |
| --- | --- | --- |
| Object | Concept | A generic concept representing an abstract information item |
| Package | Database, Domain | A collection of objects, esp. classes and sub-packages |
| Class | Table, Type | A prototype for objects |
| Super Class | | The class from which a given class is inherited |
| Sub Class | | The classes that inherit from a given class |
| Attribute | Column, Property, Field | A property defined for a class |
| Instance | Row, Record, Tuple | A single object |
| Attribute Value | Cell, Value | A property value for an instance |
| Folder | Aggregate | An object and its sub-objects |
| Relationship Definition | Associations, Foreign Key | An association definition between classes |
| Relationship | Join, Link | An association between two instances |

The system consists of objects at multiple levels of granularity, ranging from a set of databases to a single value in a record. Objects belong to Classes. For example, patient John Doe object belongs to the patient class. Relationship classes link object classes. For example, the patient-physician class links the physician class and the patient class.

Objects may have relationships with other objects. For example, patients can have relationships with physicians. Each relationship belongs to a relationship class. Each relationship is preferably a link between two objects.

A relationship class may define the formation of a folder. For example, as shown in FIG. 1, the relationship between a patient object 27 and a patient employment object 29 can be a vertical parent/child relationship that makes patient employment part of the patient folder. Thus, an object may consist of a number of sub-objects, forming a folder. A patient's folder may consist of many other objects having subjects such as patient bio-data, insurance, financial, problems, encounters and treatment records.

An object at any level of granularity may be marked with a security classification that determines its accessibility and sensitivity level. For example, patient bio-data, family and employment records have a security classification label PatientBio 27. Optionally, the security classification of data objects may be derived using security rules. For example, the security classification of patient clinical records may be derived from the type of diagnosis performed.

Subjects are the users of the system who perform functions on objects. For example, physicians are a type of subject. Subjects can only gain access to objects by having relationships to objects. Each relationship provides access to the object's folder. For example, a physician may have a relationship 14 to a patient that defines the role 32 of the physician as the patient's "primary care provider," and thereby the physician has access to the patient's folder.

Each relationship 14 defines a role 34 that the subject is performing for the object. Each such role is defined with access rights 21 to items in the folder. Each access right specifies at least what security classification the object has and also can define what functions may be performed on objects of a given security classification in the folder. For example, a "Primary Care Provider" may have read-only access to PatientBio information, but full access to Patient-Clinical information.

Optionally, subject/object relationships may also define context security rules that determine access based on the context of the relationship. For example, the physician-patient relationship may store the starting date 30 and ending date 28 of the relationship 14, which may be used to deny access before the starting date and after the ending date.

With the present invention, when a subject tries to perform a function on parts of an object's folder, the system examines the relationships between the subject and the target objects. It then examines the access rights 21 for the specified roles, and determines whether the subject has the rights to access the requested parts of the object's folder.

Object Model

Objects may be secured at many levels of granularity. At the most coarse level, the object to be secured may be the entire system, or a package. At the finest level, the object may be a single attribute value in a particular instance. Some of these objects are defined during system design and thus are part of the meta-data as shown in Table 2. Other objects are created during operation and are therefore part of the Operational data.

Following are the types of objects that may be secured:

TABLE 2

Objects, Their Location in the System and Examples.

| Secured Object | Location | Example |
| --- | --- | --- |
| System | | Contains all objects in the system |
| Package | Meta-data | All classes in the Clinical database. |
| Class | Meta-data | All instances in the Patient class |
| Folder | Meta-data | Patient John Doe's complete clinical information |
| | | Provider Midtown Medical Center's complete business information |
| Attribute | Meta-data | Patient Diagnosis attribute for all patients in the Patient Class |
| Instance | Operational Data | Patient John Doe's instance Appointment for John Doe on Jun. 5, 1989 |
| Attribute Value | Operational Data | Patient John Doe's Diagnosis |

Object classes are related to other object classes through relationship classes. These relationship classes are also object classes with their own attributes. For example, Table 3 shows the relationship classes and attributes that a healthcare system may have:

TABLE 3

Examples of Object Relationships Classes and their Attributes.

| Relationship Class | Relationship Class Attributes |
| --- | --- |
| Patient - Physician | Physician Role, Start Date, End Date |
| Patient - Provider | Account Number, Start Date, Accounts Receivable |
| Provider - Physician | Role, ID, Start Date, End Date |
| Patient - Family Member | Relationship Type, Duration, Dependency |
| Patient - Treatment instances | Prescribed Medication |
| Floor - Physician | Role, Start DateTime, End DateTime |
| Patient - Floor | Room Number, Start DateTime, End DateTime |

Relationship instances link object instances. For example, any number of instances of patient-physician relationship exist, linking physician instances to patient instances.

Object relationships play two key roles in the security system. Relationships between objects and their sub-objects create object folders. Relationships between subjects and objects form the basis of granting subjects access to their related objects.

Parent-Child Object Relationships Establish Folders

Relationship classes define folders. For example, the patient's folder may consist of:
Family member relationships
Healthcare provider relationships and any owned instances of this relationship (e.g. charges and payments).
Patient encounter instances and any instances owned by the encounter instances.
Patient treatment instances and any instances owned by treatment instances.

Securing the master instance in a folder preferably secures all the owned folder instances. For example, if access to a patient's instance is denied, access to the patient's treatment instances is automatically denied without requiring any further security specification.

Folders may have subfolders. For example, a patient encounter may consist of dozens of sub-instances, which collectively form a folder. An operation performed during the encounter may itself be a subfolder. Securing a folder at any level secures all its subfolders.

The relationship class may define limitations on accessing subfolders. For example, the patient-provider relationship class may indicate read-only access to the patient sub-folder. Thus, users who have access to the provider's folder can only have read-only access to the patient's subfolders.

A logical system object forms a logical folder that owns all the objects in the system. The purpose of the system object is to allow access to objects that do not have any reason to have relationships to users. For example, generic tables such as information on drugs and diseases are accessible only through the system folder. Generally, only high level roles such as system administrator have full access to these objects, and most other system users have read-only access.

Object Security Classifications

Figure 2:
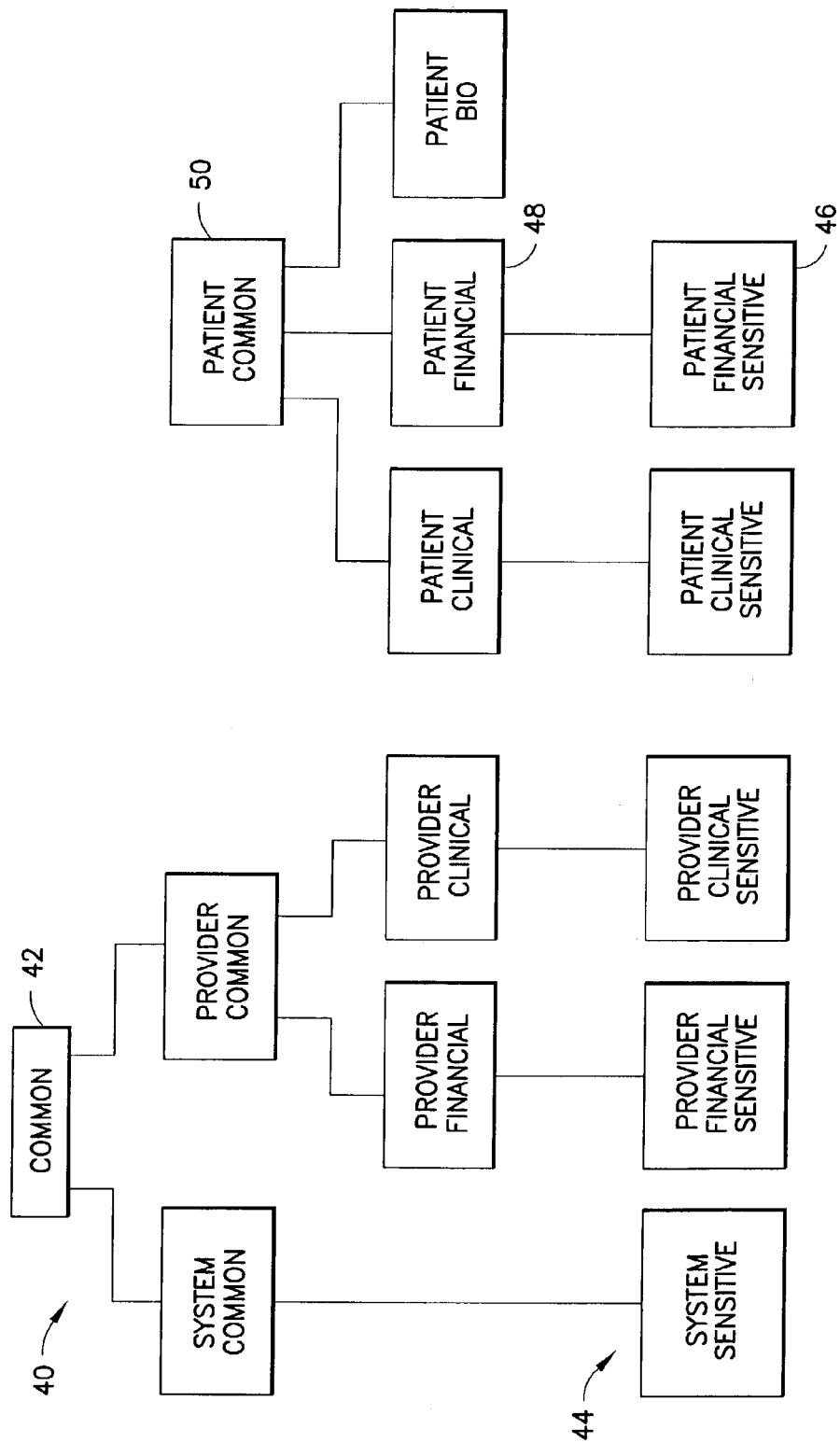
FIG. 2 is a block diagram of an example of security classifications for the present invention.

Referring to FIG. 2, each object in a system 40 can be assigned a security classification label. The security classification label is a measure of the sensitivity of the information, and is the means through which access may be allowed or denied.

Security classification labels can be linked and can be formed in a hierarchical structure. A security classification label A may have a parent label B, so that granting access to A automatically grants access to B and all antecedents of B. The labels towards the root 42 of the hierarchy are for less sensitive information and have a lower security rank, whereas labels towards the leaf 44 are more sensitive and have a higher security rank. When a subject is provided access to a more sensitive label, they also have access to the less sensitive labels that are its antecedents. For example, referring to FIG. 2, if a user has access to Patient Financial Sensitive 46 information, they also have access to Patient Financial 48 and Patient Common 50 information. The purpose of linking security classification labels is to simplify the task of assigning access rights.

There is no requirement in the system that all labels form a single hierarchy. In fact, the labels may form many different kinds of patterns: single stand alone labels, linear ranked lists, or hierarchies. Any number of such patterns may exist in a single secured system 40.

Objects may be labeled with security classifications. Most of security classifications are on meta-data objects. More advanced security options may label operational data objects such as an instance or an attribute value.

If an object is not assigned a security classification label, it inherits its security classification label. The source of its inheritance is shown in Table 4:

TABLE 4

Inheritance of Security Classifications

| Secured Object Type | If no direct label, then the label is inherited from: |
|---|---|
| System | — |
| Package | Master Package (if any), Otherwise System |
| Class | Stricter of Package or Super Class |
| Folder | Owning Instance |
| Attribute | Class |
| Instance/Record | Class |
| Attribute Value | Stricter of Instance or Attribute |

The system object preferably always has a default security classification label. If an object in the system does not have a direct security label and has no ancestors that have a security label, then it inherits the security label of the system object.

Figure 3:
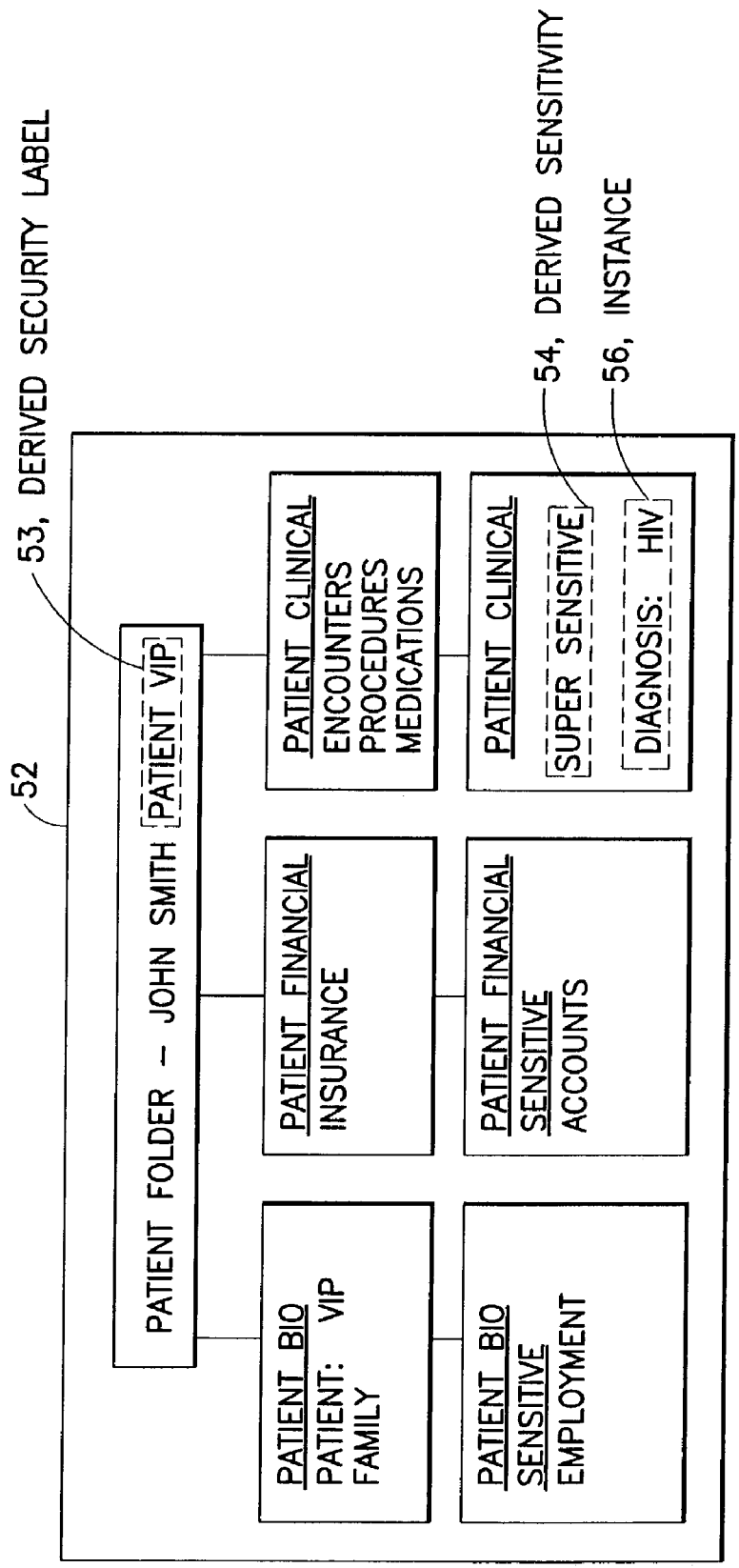
FIG. 3 is a block diagram of an example of rule driven security for the present invention.

The security classifications for an instance or an attribute value may be obtained using derivation rules. For example, as shown with patient folder 52 in FIG. 3, the security classification for the patient diagnostic instance 56 may be derived from the sensitivity level of the problem diagnosed, thus allowing an extra level of security such as super sensitive 54 for patients diagnosed with certain types of diseases, such as HIV. Similarly, if an attribute in the patient's folder designates the patient as a VIP, the patient folder may be marked with a Patient VIP security label 53. A derived classification may be derived at the time the respective data is entered and stored as part of the instance, or it may be obtained at the time security is enforced. In other words, it may be persistent or non-persistent.

Subject-Object Relationships and Roles

Subjects are a special class of objects that are the users of the system. Subject-object relationships form the basis of the access control of the present invention.

Figure 4:
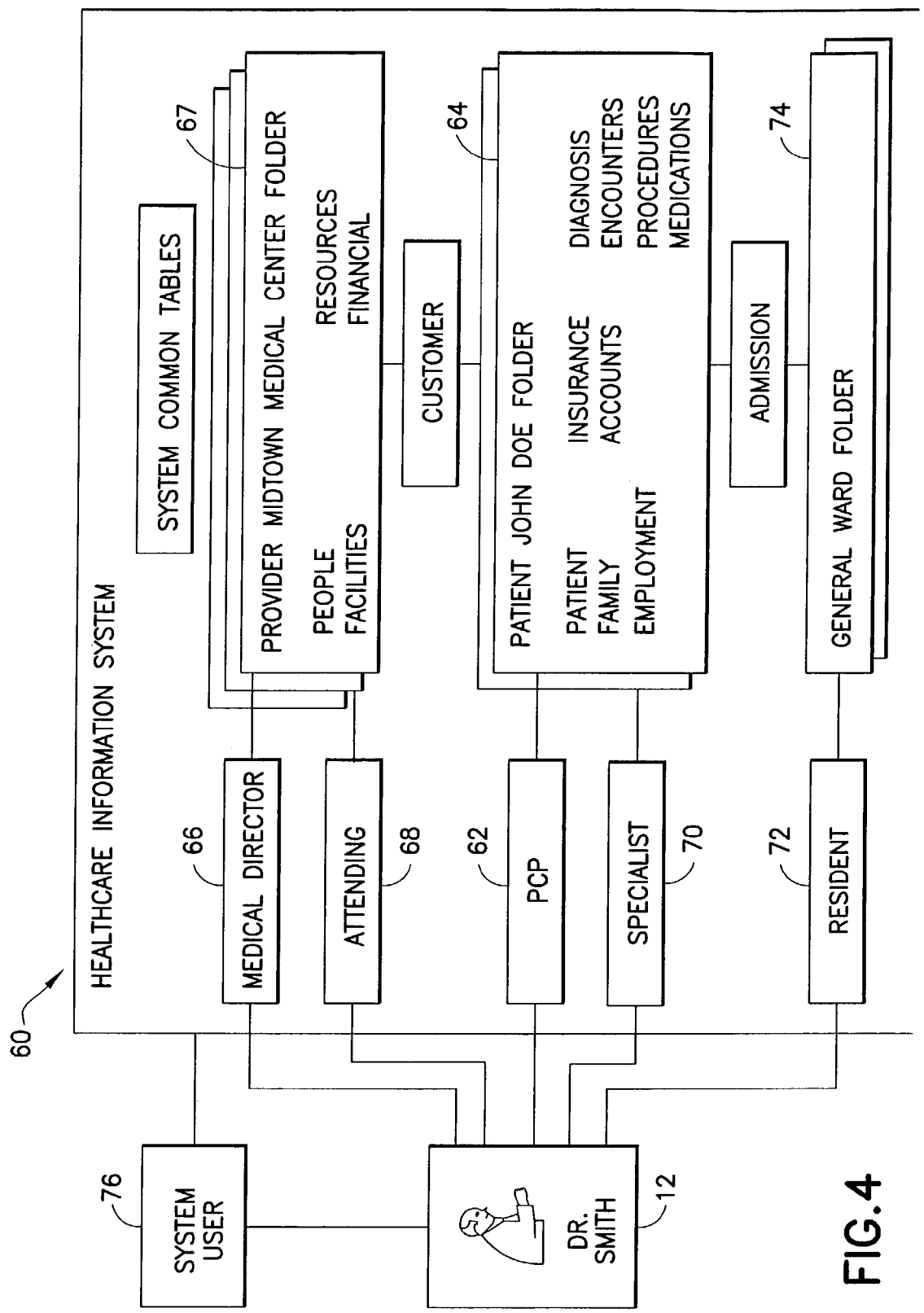
FIG. 4 is a block diagram of an example of subject/object relationships for the present invention.

As shown in system 60 of FIG. 4, relationships between subjects and objects provide the basis for access control of the present invention. If a subject has a relationship to an object, then it has access to the folder of that object. The type of relationship is the subject's role for the object, wherein the role defines the precise access rights for the subject. For example, relationship between physician "Dr. Smith" 12 and patient "John Doe" may define the role of Dr. Smith as primary care physician (PCP) 62. Mr. Smith now has access to John Doe's folder 64, and has the access rights defined for the role "Primary Care Physician."

A subject may have any number of relationships. Each relationship has a unique role, which defines the precise rights that the subject has over the corresponding folders. For example, Mr. Smith may have a "Medical Director" role 66 at one provider having folder 67, an "Attending" role 68 at another provider, be the "Primary Care Physician" 62 for one patient, a "Specialist" role 70 for another patient, and act as a "Resident" role 72 for the General ward having folder 74. Each of these relationships brings precise access to corresponding folders. FIG. 4 shows an example of these relationships.

Thus, a subject may have multiple relationships to the same object. For example, Dr. Smith may be the PCP for patient John Doe, a medical director for the provider who has the patient as a customer, and a resident for a ward where the patient is admitted. Each of these relationships defines a role for Dr. Smith and gives him specific rights to the Patient John Doe's folder. His full rights to this patient's folder is the aggregate of all such rights.

Although it is stated herein that the role defines the access rights, it should be understood that the relationship name itself can equally define the role and its access rights. For example, a doctor can have a "primary care provider" relationship and an "attending physician" relationship with a patient and these relationships can define the doctor's access rights to the patient's information.

Every subject preferably also has a relationship to the system, such as system user 76, which defines the basis for getting access to all the objects that the subject cannot access through any other relationship. This relationship is typically stored alongside the system's authentication information.

A subject is also stored as an object in the system, and preferably has a self role to its own object. Each type of subject may have a different self role, and each such role may define how the subjects may access or manipulate its own information. For example, a patient may have read-only access to his entire folder, but can modify only his bio-data information.

Roles and Access Rights

Referring to FIG. 5, each role 78 is defined with a specific set of access rights 80 to the target objects that are exposed through the relationship. A role 78 may have any number of access rights. Each access right 80 specification preferably consists of a security classification 82 and a function classification 84. The security classification 82 indicates the type of objects that may be accessed through this right. The function classification 84 indicates the type or types of functions that may be performed on the object.

Functions themselves can have a hierarchy, so that Full function includes the ReadWrite function, whereas the ReadWrite function includes the ReadOnly function. A generic set of such functions is defined by the system for all objects. In addition, each object may define its own set of functions.

In addition to roles, subject/object relationships preferably have other contextual information or rules that control the access to the object. Almost certainly, a relationship is likely to have the start and end time of the relationship. Subject/object relationships have additional security rules that control the access based on contextual information. For example, a rule that allows security access starting on the start date/time of relationship, and ending 24 hours after the ending date/time may be represented in computer code as:

Current_Date_Time BETWEEN Start_Date_Time
    AND (End_Date_Time+"24:00:00")

IMPLEMENTING THE PRESENT INVENTION

The access control system may be implemented in a variety of ways. The options include:

integrated as part of a database management system to secure access to the database objects.

integrated in an object management system, such as an object request broker, to secure access to the objects accessed through the system.

implemented in a specific application such as a healthcare application.

implemented as a standalone security server. An example of a security server system 90 is shown in FIG. 6.

Security System Design

Figure 6:
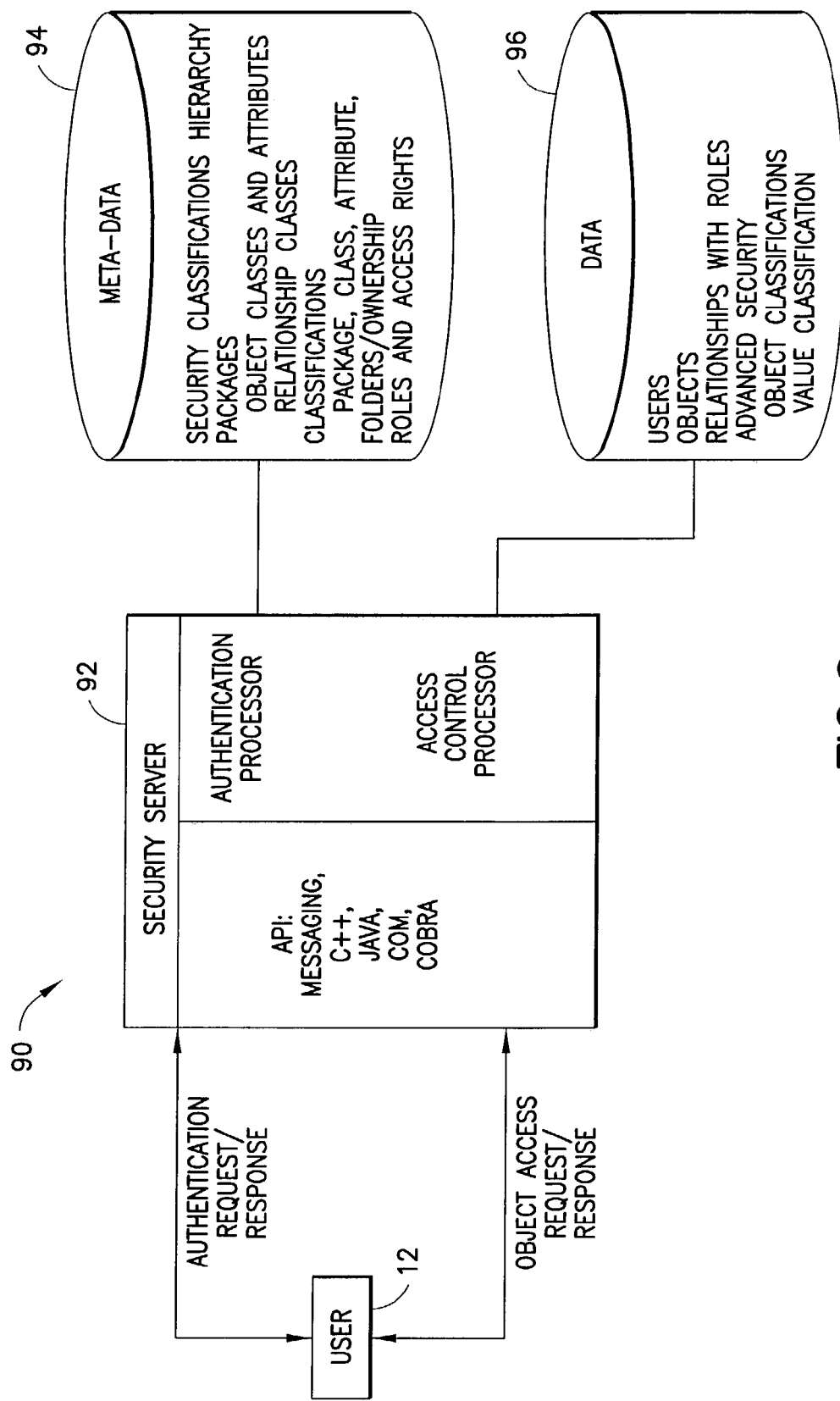
FIG. 6 is a block diagram of an example of security server in accordance with the present invention

FIG. 6 shows an example of a security server. The steps for designing the security system design are:
1. Design a security classification hierarchy that serves the security needs of the organization.
2. Determine the necessary data 96. Design or reverse engineer the object classes and attributes of all the objects that need to be secured. Store these in meta-data 94.
3. Assure that object relationships are properly defined in the object model. Also mark the folder ownership to create logical folders. Store these in meta-data 94.
4. Mark all meta-data objects 94, i.e. packages, classes, attributes and functions, with appropriate security classifications. All unmarked objects will inherit their classifications.
5. Define a set of roles that encompass all the roles in all direct or indirect subject/object relationships in the system. Store these in meta-data 94.
6. Define a set of access rights for each role. Store these in meta-data 94.
7. Define context related security rules for each relationship. For example, if the relationship has a start and end date, then the rule may limit access only between those dates. Store these in meta-data 94.
8. Where required, define security rules to mark instance and attribute value security. Store these in operational data 96.

This process defines all the meta-data requirements to enforce security. The system is now ready for operation.

Security Administration

Ongoing security administration needs with the present invention are comparatively limited. This administration can include when relationships are created between subjects and objects, such as assigning a physician to a patient or adding a user to the system, make sure that the role, start date/time, and end date/time are appropriately recorded. For the most part, this information alone drives the entire access enforcement process.

For more advanced security, individual instances may be marked with their own security classification. For example, a VIP patient may have a top-secret classification. Additionally, some attribute values may be stamped with their security classification. For example, instead of marking the whole VIP patient instance, only the diagnosis may be marked secret.

Flow Diagrams

Figure 7:
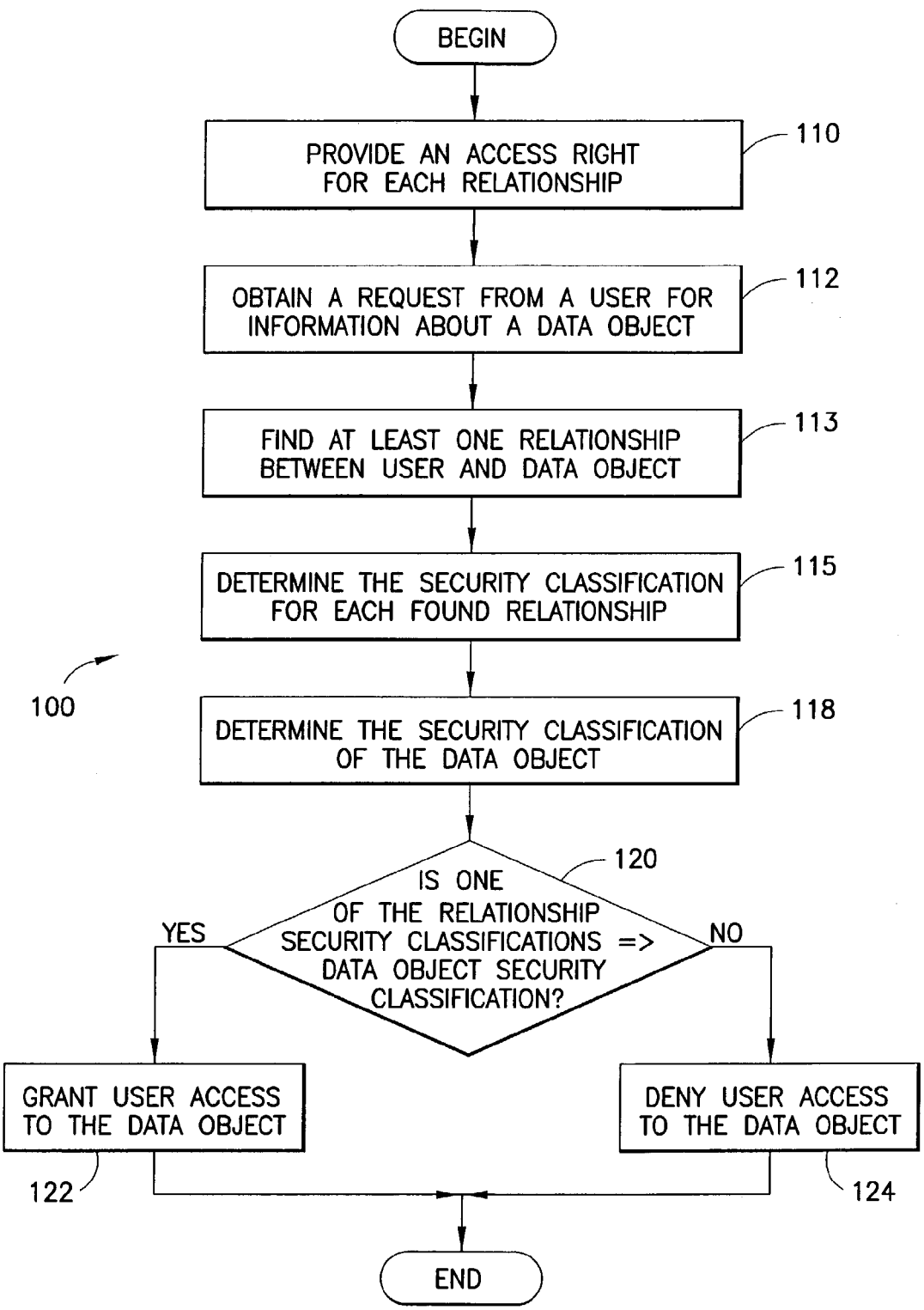
FIG. 7 is a flow diagram showing the method of the present invention.

Methods for controlling access to information on a computer system are shown in FIGS. 7–9B. Referring to FIG. 7, the system is first provided 110 as described above. The method of access control 130 is initiated when a subject tries to perform an operation on an object. The system will obtain 112 an access request from a user for information about a data object. The access request preferably contains: 1) the subject class and ID (at this point, the subject is already authenticated); 2) the instance class and ID; 3) the attribute or a list of attributes that are being accessed; and 4) the function to be performed.

The system will find 114 at least one of the relationships, if one exists, between the user and object. Alternatively, all the relationships that exist can be found. Generally, at least one relationship will be found, i.e. from the user to the system. If the user has other direct or indirect relationships to the object, additional relationships may be found. If only one of the relationships was initially found and access was not granted to the object, the system can continuously go back and find another relationship until it is conclusively determined that the user has access or does not.

After the relationships have been found between the user and the object, determine 116 the security classification from the access rights for each relationship. This step may comprise obtaining the role from each relationship, then obtaining the list of access rights for the role. Alternatively, the relationship itself can state the type of relationship. An access right may also comprise a functional classification limiting the functions that the user can perform on the object.

Next, determine the security classification labels for the object 118. For an instance security label, obtain the most restrictive of: the class label stored in the meta-data, the instance label stored in the operational data, or an instance label obtained from a security rule. For an attribute security label, obtain the most restrictive of: the attribute label class, the attribute label stored in the operational data, or an attribute label obtained from a security rule. If both an instance security label and an attribute security label exist, use the most restrictive of these.

Next, determine if the user can be granted access to the data object. If the security classification of the relationship is greater than the data object's security classification, then grant the user access 122 to the data object. Otherwise, if the security classification of all the relationships are less than the data object's security classification, then deny the user access 124 to the data object.

With the present invention, each relationship security classification can be compared with the security classification of the object until it is determined that the user has access. Alternatively, all relationship security classifications can be compared with the security classification of the object and the user access can be determined after the comparisons.

By stating that the security classification can be "greater," it should be understood that greater is defined as having a security level adequate to allow access to the data object. Additionally, other variations of methods can be used for determining the adequacy of the relationship's security level when compared to the data object's security level. For example, the system may require the user-object relationship to have a greater or equal security classification than the data object's security classification.

If the access to the data object is granted, it is also possible to add an entry to an available access right list noting the functions that are allowed to be performed by the access right's function classification. If the function the user desires to perform on the object that is in the list of available rights, then return "Access granted". Otherwise, return "Access denied" and optionally return the functions that are available. If the user's request consisted of multiple objects, for example multiple instances or attributes, the system can return an appropriate response for each object.

Referring to FIG. 8, a method for controlling access 130 can specifically include the steps of obtaining access 132 to the computer system and providing 134 and identification of the user. In this embodiment of the invention, the system determines each relationship 114 between the user and the data object and determines the security classification for all relationships. Furthermore, the system can determine if no relationships exist 136 between the object and the user and deny access 124 to the data object on that basis.

Figure 9B:
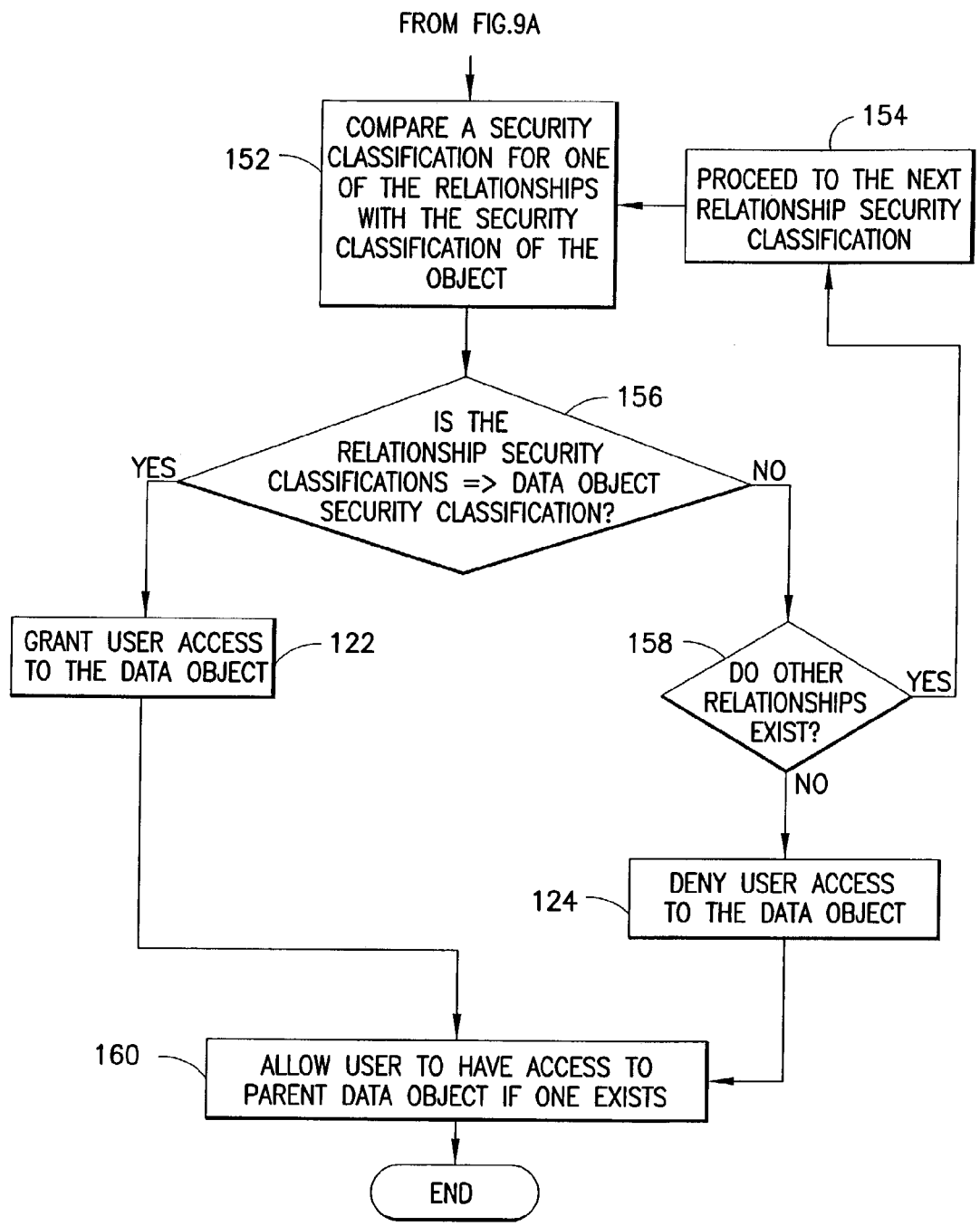

Referring to FIGS. 9A and 9B, a method for controlling access 140 can also include rule based security classifications. The system will first determine if any security rules exist 148. If the instance has a non-persistent security label that is determined through one or more derivation rules, apply 150 the one or more rules to obtain the security labels. Depending on the needs of the system, the applicable security label can be the most or least restrictive of these security labels and the persistent security label. Preferably, however, the applicable security label is the most restrictive of these security labels.

If the invention described herein is made useable for a computer, it can be stored on a computer usable medium having computer readable program code means embodied therein for completing the method. The computer readable program code means can include any type of computer language available or a representation of the computer language thereof, such as machine code, assembly language, compiler language, alphanumeric code or binary code. The computer usable medium can include any magnetic, electric or optical device for storing computer language, such as hard disks, floppy disks, CD-ROMS, optical drives or zip drives.

It should be understood that the foregoing is illustrative and not limiting and that obvious modifications may be made by those skilled in the art without departing from the spirit of the invention. Accordingly, reference should be made primarily to the accompanying claims, rather than the foregoing specification, to determine the scope of the invention.

What is claimed is:

1. A method for controlling access to information on a computer system being accessible to a plurality of users, wherein the computer system has information including a plurality of data objects, the steps comprising:
   providing an access right for each user-object relationship between a user and a data object, wherein each user can have a plurality of relationships to each data object, wherein at least one user has a plurality of relationships with one data object, and wherein each access right comprises a security classification such that there is a respective security classification for each user-object relationship;
   obtaining a request from a user for information about a data object where the user has a plurality of relationships with the data object, each relationship defining a respective user-object relationship;
   finding the plurality of user-object relationships;
   determining the security classification for each user-object relationship;
   determining a security classification of the data object;
   granting the user access to the data object if a level of one of the security classifications for all the user-object relationships is greater than a level of the security classification of the data object; and
   denying the user access to the data object if the security classifications for all the user-object relationships are less than a level of the security classification of the data object.

2. The method for controlling access to information according to claim 1, wherein each access right further comprises a function classification for specifying one or more functions that may be performed on the data object, further comprising the step of limiting functional access to the data object to the one or more functions specified by the function classification.

3. The method for controlling access to information according to claim 1, further comprising the step of applying at least one rule to determine the security classification for each user-object relationship.

4. The method for controlling access to information according to claim 1, wherein the computer system is a server and the user is a client of the server, and further comprising the step of allowing a user to obtain access to the server.

5. The method for controlling access to information according to claim 1, wherein the computer system is a local area network server and the user is a client of the server, and further comprising the step of allowing a user to obtain access to the local area network server.

6. The method for controlling access to information according to claim 1, further comprising the step of obtaining access to the data object after being granted access to the data object.

7. The method for controlling access to information according to claim 1, further comprising the step of denying the user access to the data object if no user-object relationship exists between the user and the data object.

8. A method for controlling access to information on a computer system being accessible to a plurality of users, wherein the computer system has information including a plurality of data objects, the steps comprising:
   providing an access right for each user-object relationship between a user and a data object, wherein each user can have a plurality of relationships to each data object, wherein at least one user has a plurality of relationships with one data object, and wherein each access right comprises a security classification and a function classification for specifying one or more functions that may be performed on the data object such that there is a respective security classification and a respective function classification for each user-object relationship;
   obtaining access to the computer system;
   providing an identification of a user;
   providing a request from the user for information about a data object where the user has a plurality of relationships with the data object, each relationship defining a respective user-object relationship;
   determining a security classification of the data object;
   granting the user access to the data object and limiting functional access to the data object to the one or more functions specified by the function classification if a level of one of the security classifications for all the user-object relationships is equal to or greater than a level of the security classification of the data object;
   denying the user access to the data object if no user-object relationship exists between the user and the data object; and
   denying the user access to the data object if the level of the security classifications for all the user-object relationships are less than the level of the security classification of the data object.

9. The method for controlling access to information according to claim 8, further comprising the steps of:
  determining each user-object relationship between the user and the data object; and
  comparing the security classification for each user-object relationship with the security classification of the data object.

10. The method for controlling access to information according to claim 8, further comprising the step of applying at least one rule to determine the security classification for each user-object relationship.

11. The method for controlling access to information according to claim 8, wherein the computer system is a server and the user is a client of the server, and wherein the step of obtaining access to the computer system comprises obtaining access to the server.

12. The method for controlling access to information according to claim 8, wherein the computer system is a local area network server and the user is a client of the server, and wherein the step of obtaining access to the computer system comprises obtaining access to the local area network server.

13. An article of manufacture, comprising:
  a computer usable medium having computer readable program code means embodied therein for controlling access to information on a computer system being accessible to a plurality of users, wherein the computer system has information including a plurality of data objects, the computer readable code means comprising:
  computer readable program code means for causing the computer system to provide an access right for each user-object relationship between a user and a data object, wherein each user can have one or more relationships to each data object, and wherein each access right comprises a security classification, such that there is a respective security classification for each user-object relationship;
  computer readable program code means for causing the computer system to accept a request from a user for information about an object where the user has a plurality of relationships with the data object, each relationship defining a respective user-object relationship;
  computer readable program code means for causing the computer system to determine each user-object relationship;
  computer readable program code means for causing the computer system to determine the security classification for each user-object relationship;
  computer readable program code means for causing the computer system to determine a security classification of the data object;
  computer readable program code means for causing the computer system to grant the user access to the data object if a level of one of the security classifications for all the user-object relationships is equal to or greater than a level of the security classification of the data object; and
  computer readable program code means for causing the computer system to deny the user access to the data object if the level of the security classifications for all the user-object relationships are less than the level of the security classification of the data object.

14. The article of manufacture according to claim 13, further comprising computer readable program code means for causing the computer system to compare the security classification for each user-object relationship with the security classification of the data object.

15. The article of manufacture according to claim 13, wherein each access right further comprises a function classification for specifying one or more functions that may be performed on the data object, further comprising computer readable program code means for causing the computer system to limit functional access to the data object to the one or more functions specified by the function classification.

16. The article of manufacture according to claim 13, wherein the security classifications are further determined by rules, and further comprising computer readable program code means for causing the computer system to apply at least one rule to determine an additional security classification for each user-object relationship.

17. The article of manufacture according to claim 13, wherein some of the data objects can have a vertical relationship defined by a parent data object and a child data object, wherein the child data object has a more restrictive security classification than the parent data object, further comprising:
  computer readable program code means for causing the computer system to provide a data object folder for each vertical relationship; and
  computer readable program code means for causing the computer system to grant the user access to a parent data object if the user has access to the child data object.

* * * * *